United States Patent [19]
Gaskins et al.

[11] Patent Number: 5,930,821
[45] Date of Patent: Jul. 27, 1999

[54] METHOD AND APPARATUS FOR SHARED CACHE LINES IN SPLIT DATA/CODE CACHES

[75] Inventors: Darius Gaskins; G. Glenn Henry, both of Austin, Tex.

[73] Assignee: Integrated Device Technology, Inc., Santa Clara, Calif.

[21] Appl. No.: 08/854,641

[22] Filed: May 12, 1997

[51] Int. Cl.$^6$ ................................................ G06F 12/00
[52] U.S. Cl. .................. 711/146; 711/141; 711/166; 395/586; 395/392; 395/750.04
[58] Field of Search ................... 711/146, 166, 711/141; 395/586, 392, 750.04

[56] References Cited

U.S. PATENT DOCUMENTS

| | | | |
|---|---|---|---|
| 5,651,137 | 7/1997 | MacWilliams et al. | 711/141 |
| 5,669,003 | 9/1997 | Carmean et al. | 395/750.04 |
| 5,710,906 | 1/1998 | Ghosh et al. | 711/146 |
| 5,790,827 | 8/1998 | Leung | 395/392 |
| 5,805,878 | 9/1998 | Rahman et al. | 395/586 |
| 5,809,548 | 9/1998 | Chang et al. | 711/166 |
| 5,813,036 | 9/1998 | Ghosh et al. | 711/146 |

*Primary Examiner*—John W. Cabeca
*Assistant Examiner*—Nasser Moazzami
*Attorney, Agent, or Firm*—James W. Huffman

[57] ABSTRACT

An apparatus and method for sharing cache lines within a split data/code cache is provided. The invention utilizes cache snoop and state control, coupled to both a data cache and a code cache, which allows the data cache to snoop fetches to the code cache, and allows the code cache to snoop reads and writes to the data cache. In addition, cache snoop and state control modifies the state of a particular cache line within both of the caches according to the MESI cache coherency protocol to allow a single cache line to reside in both the data cache, and the code cache, in a Shared state. The invention allows the shared cache line to be fetched from the code cache, and retrieved from the data cache, until it is overwritten or modified in the data cache. In one embodiment, an instance of a cache line within either the code or data cache can be snarfed into the other cache, and marked as shared.

45 Claims, 8 Drawing Sheets

| Processor Activity | Cache action, and MESI state | Bus Activity Required? |
|---|---|---|
| Fetch Read Instruction | Code retrieved into Code Cache | Yes |
| Read $Code_c$ Instruction | Code read into Data Cache, Code Cache Invalidated | Yes |
| Fetch Modify Instruction | Code retreived into Code Cache, Data Cache Invalidated | Yes |
| Fetch Write Instruction | Code retrieved into Code Cache, Data Cache Invalidated | No |
| Write $Code_c^{MOD}$ | Modified Code written to Memory, not Data Cache | Yes |

Code Modification of $Code_3$

| Processor Activity | Cache action, and MESI state | Bus Activity Required? |
|---|---|---|
| Fetch Read Instruction | Code retrieved into I-Cache, I-cache marked shared | Yes |
| Read Code$_c$ Instruction | Code read into Data Cache, D-cache marked shared | No |
| Fetch Modify Instruction | Code provided by I-cache | No |
| Fetch Write Instruction | Code provided by I-cache | No |
| Write Code$_c^{MOD}$ | Code$_c^{MOD}$ written to D-cache, I-cache marked invalid, D-cache modified | No |

Code Modification of Code$_3$ within MESI enabled L1 cache

FIG. 10 (Related art)

| Processor Activity | Cache action, and MESI state | Bus Activity Required? |
|---|---|---|
| Fetch Code$_1$ | Line read into I-cache, D-cache marked invalid | Yes |
| Code$_1$ reads Data | Line read into D-cache, I-cache marked invalid | Yes |
| Fetch Code$_2$ | Line read into I-cache, D-cache marked invalid | Yes |
| Code$_2$ reads Data | Line read into D-cache, I-cache marked invalid | Yes |
| Fetch Code$_3$ | Line read into I-cache, D-cache marked invalid | Yes |
| Code$_3$ modifies & writes Data | Data written to memory | Yes |

Data & Code within same cache line

FIG. 11

METHOD AND APPARATUS FOR SHARED CACHE LINES IN SPLIT DATA/CODE CACHES

BACKGROUND

1. Field of the Invention

This invention relates in general to the field of data coherency within cache memory, and more particularly to a method and apparatus for sharing a cache line within a split data/code cache.

2. Description of the Related Art

Modern computer systems employ a number of different memory devices and memory architectures to store instructions that will be executed, and/or data that will be processed. The types of devices used, and the manner in which they are coupled, vary from system to system, depending on a designer's criteria. To illustrate a common manner of employing different memory devices, reference is now made to FIG. 1.

Figure 1:
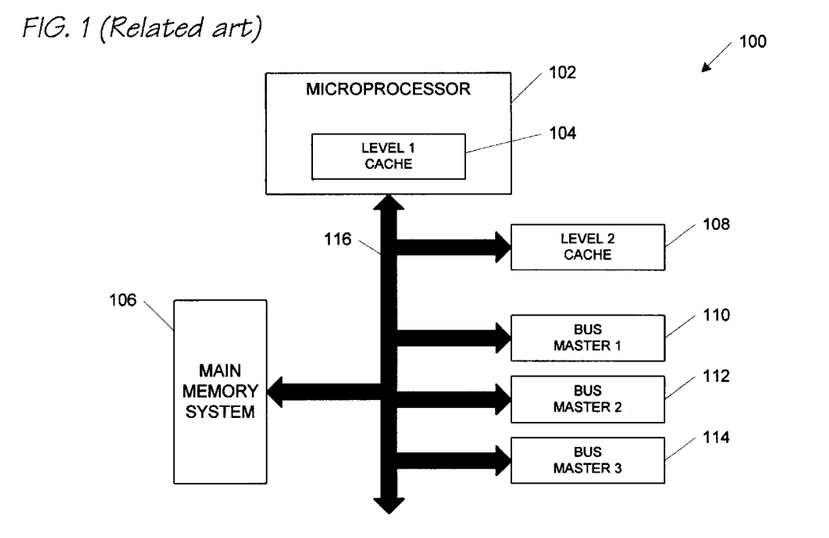
FIG. 1 is a block diagram of a related art multi-master computer system having a level 1 cache memory within a microprocessor.

In FIG. 1, a computer system 100 is shown. The computer system 100 includes a microprocessor 102, connected to a main memory system 106 via a system bus 116. The microprocessor 102 also includes an on-chip level 1 cache 104 for temporarily storing a portion of the data in the main memory 106. Also connected to the main memory 106 via the system bus 116 are a plurality of bus master devices 110, 112, and 114, and a look-aside level 2 cache 108.

In operation, the microprocessor 102 fetches instructions from the main memory 106, executes the instructions, and reads data from, or writes data to, the main memory 106. The main memory 106 is also connected to a secondary storage device, such as a hard disk drive (not shown) which provides permanent storage for instructions and data.

The main memory 106 provides the primary storage for instructions and data that will be utilized by the microprocessor 102. The main memory 106 is typically provided by a plurality of DRAM (dynamic random access memory) chips, which are relatively inexpensive, but are slow in comparison to the speed of the microprocessor 102.

Closer to the microprocessor 102 is the level 2 cache 108. The level 2 cache 108 provides significantly less storage than the main system memory 106, and is much more expensive than the main memory 106. However, it provides a significant performance advantage over the main memory 106 because it responds to read and write operations much faster than the main memory 106.

Within the microprocessor 102 is the level 1 cache 104. The level 1 cache 104 stores even less data than the level 2 cache 108. However, because it is located within the microprocessor 102, it can respond to read and write requests much faster than can the level 2 cache 108, or the main memory 106. In addition, if read or write requests by the microprocessor 102 can be responded to by the level 1 cache 104, the processor 102 does not have to access the system bus 116. This improves the performance of the microprocessor 102, as well as that of the entire computer system 100. The performance of the computer system 100 is improved because other devices, such as the bus master devices 110–114, can utilize the system bus 116 while the microprocessor 102 is executing instructions using the level 1 cache 104. One skilled in the art should readily appreciate the advantages of using the three level memory system discussed above with respect to the computer system 100, particularly the use of intermediate caches, and on-chip caches. However, for a more complete background on the use of cache memory, the reader is referred to Chapter 14, *ISA SYSTEM ARCHITECTURE*, by Shanley/Anderson, 3$^{rd}$ edition, which is hereby incorporated by reference.

An improvement in memory architecture, especially on-chip cache architecture, that has recently been developed, is the separation of caches within a microprocessor, one dedicated to storing data, the other dedicated to storing code. An example of this improvement is shown in FIG. 2, to which reference is now made.

Figure 2:
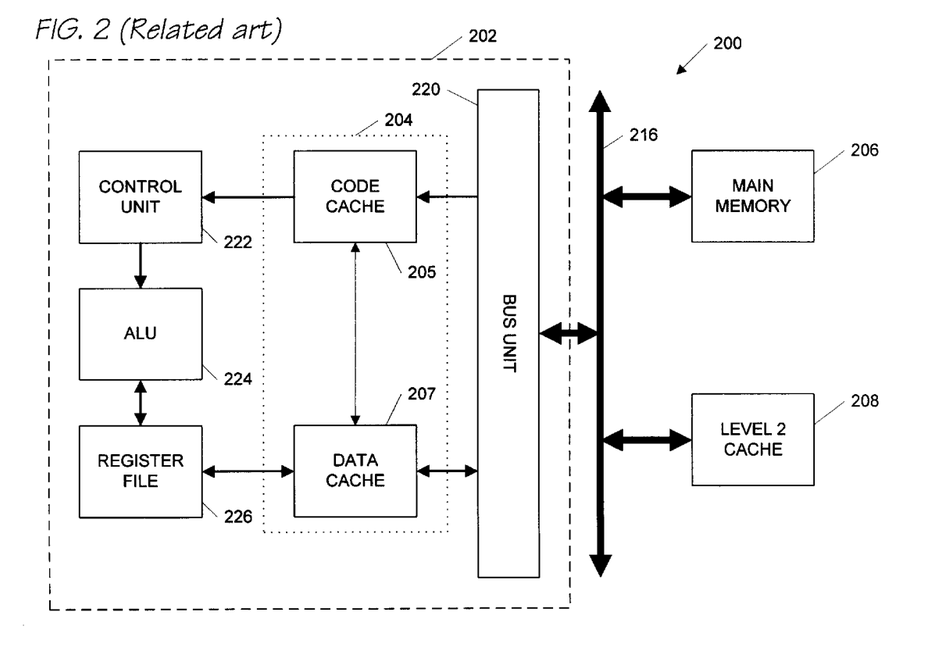
FIG. 2 is a block diagram of a related art computer system particularly illustrating a split data/code cache within a microprocessor.

In FIG. 2, a computer system 200 is shown. The computer system 200 includes a microprocessor 202 connected to a main memory 206, and a look-aside level 2 cache 208, via a system bus 216. Other devices may be connected to the system bus 216, but have not been shown. Within the microprocessor 202 is a level 1 cache 204. The level 1 cache 204 is connected to the system bus 216, and thus to the main memory 206 and the level 2 cache 208, via a bus unit 220.

Within the level 1 cache 204 is a split code cache 205 and data cache 207. The code cache 205 responds to instruction fetch requests by a control unit 222. The data cache 207 responds to read and write requests by the ALU 224 by storing data from, or writing data to, a register file 226.

By splitting the level 1 cache 204 into separate code and data caches 205, 207, respectively, instruction fetches by the control unit 222 no longer need to wait on read requests by the ALU 224 to complete before instructions can be delivered to the control unit 222. To illustrate this point, presume that the level 1 cache 204 is unified, rather than split. In addition, presume the microprocessor 202 is executing an instruction that moves data from a memory location in the main memory 206 into a register within the register file 226. If the cache 204 is not split, the control unit 222 is essentially stalled from fetching the next instruction, until the data has been retrieved from the main memory 206, and provided to the level 1 cache 204. Separating the code and data caches 205, 207 within the level 1 cache 204 eliminates this internal contention problem. The use of a split data/code cache, as described above, has been incorporated into modern x86 microprocessors.

However, when the level 1 cache 204 is split into separate data and code portions, another problem is created, to which the present invention is addressed. The problem is best illustrated by reference to FIG. 3.

Figure 3:
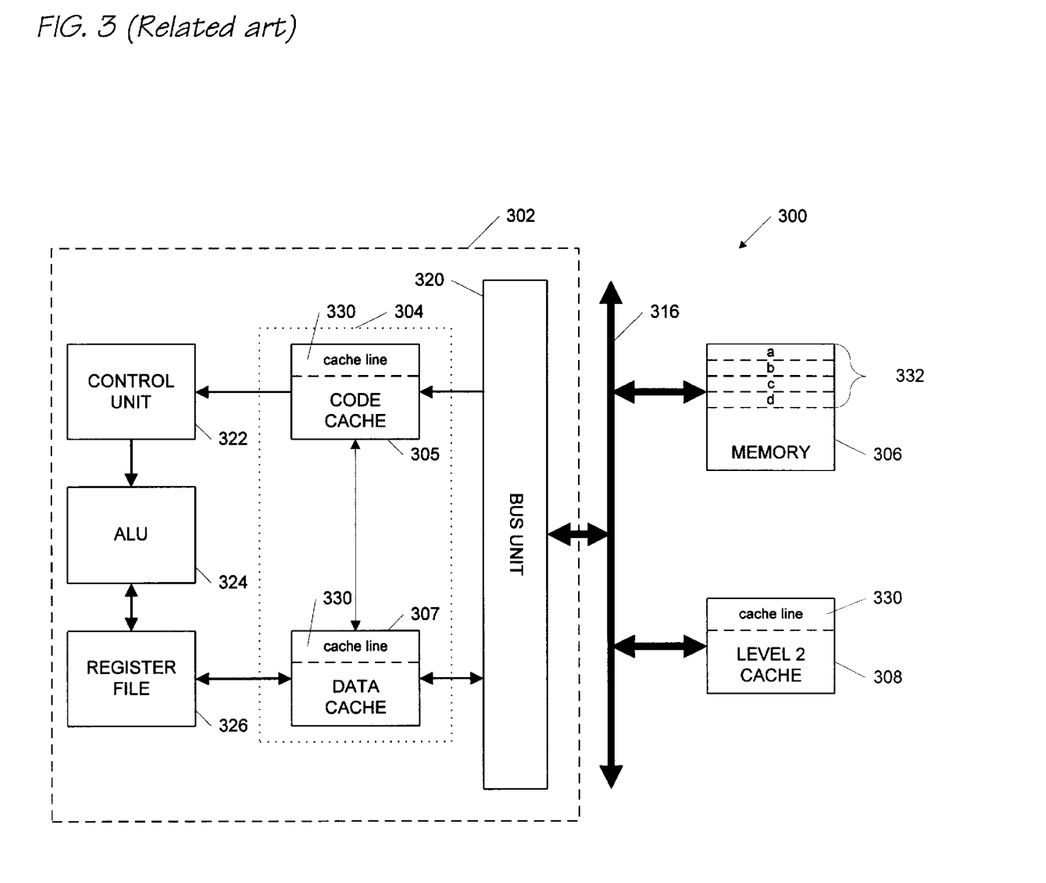
FIG. 3 is a block diagram of the computer system of FIG. 2, particularly showing a shared cache line within the code cache, the data cache, and memory.

In FIG. 3, a computer system 300 is shown. The computer system 300 is essentially like that described above in FIG. 2. Like elements have like numbers, with the hundreds digit replaced with a 3.

At any given time, a particular byte of data (or code) may be simultaneously stored in the main memory 306, the level 2 cache 308, and the level 1 cache 304. If the data is stored within the level 1 cache, it can be provided to the control unit 322, or utilized by the register file 326, without requiring the microprocessor 302 to access the system bus 316.

This byte of data is stored within what is commonly referred to as a cache line. A cache line is typically composed of a number of bytes of data that can be read or written, from or to the main memory, in back to back transfers. Shown in FIG. 3 is a cache line 330 that stores 32 bytes of data. The cache line 330 is retrieved from the main memory 306 locations a,b,c,d 332, in four back to back transfers of eight bytes each, and placed into the level 2 cache 308, and into the level 1 cache 304. Future requests by the microprocessor 302 to any of the memory locations a,b,c,d 332 may then be fulfilled by the cache line 330 within the level 1 cache.

However, prior to the present invention, the memory locations 332 could only be stored in the cache line 330 within either the code cache 305, or the data cache 307, but not in both at the same time. When the cache line 330 is required, first by the control unit 322 (for instruction fetches), and second by the ALU 324 (for data reads and writes), the level 1 cache 304 first retrieves the cache line 330 into the code cache 305 over the system bus 316. Later, the cache line 330 is retrieved into the data cache 307 over the system bus 316, and the cache line 330 in the code cache 305 is invalidated. If the control unit 322 again requires access to the cache line 330, another fetch is made by the level 1 cache 304, over the system bus 316, to place the cache line 330 into the code cache 305. In addition, the cache line 330 in the data cache 307 is invalidated, since the cache line 330 can only reside in the code cache 305, or the data cache 307, but not in both. This back and forth contention for the cache line 330, which forces the microprocessor 302 to retrieve a cache line from the main memory 306, and invalidate the cache line 330 in the competing cache, is known as thrashing. Thrashing significantly effects the performance of a computer system, because it requires a microprocessor to halt processing every time a cache line has to be retrieved over the system bus.

Thrashing is common in a level 1 cache when code modification software is executing, particularly when the code that is being modified is in the same cache line as the code that is performing the modification. It is also common in situations where a program is processing data, and the data that is being processed resides within the same cache line as the program. Both of these situations are very common and will be discussed further in the Detailed Description below.

However, what should be clear from the above is that an invention is needed that allows a cache line to coexist in both a code cache, and in a data cache, for as long as possible, to allow fetches of code, and reads of data, within the same cache line, to be handled entirely within an on-chip split data/code cache, without requiring a microprocessor to retrieve the cache line over the system bus.

SUMMARY

For the foregoing reasons, there is a need for an apparatus and method that allows data within an on-chip split cache to be shared by both the code and data caches.

To address the above-detailed deficiencies, it is an object of the present invention to implement a MESI cache coherency protocol within an L1 on-chip split data/code cache.

It is a further object of the present invention to allow a cache line to coexist in both data and code caches, at least until the data cache is modified.

Accordingly, in the attainment of the aforementioned objects, it is a feature of the present invention to provide a microprocessor, which implements MESI within a split L1 cache. The microprocessor includes a bus unit, a data cache, a code cache, and cache snoop and state control logic. The bus unit connects the microprocessor to an external system bus. The data cache is coupled to the bus unit, and temporarily stores data that is read from a memory on the system bus, or is to be stored in the memory. The data cache includes a first plurality of cache lines. The code cache is also coupled to the bus unit, and temporarily stores code that is fetched from the memory. The code cache includes a second plurality of cache lines. The cache snoop and state control logic is coupled to the data cache and to the code cache. The cache snoop and state control logic allows a cache line to be stored in both of the data cache and the code cache, while maintaining coherency between both instances of the cache line.

An advantage of the present invention is that repetitive accesses to a cache line that is both fetched as code, and read as data, does not require the processor to continually go out to the system bus to fill the appropriate cache.

A further advantage of the present invention is that code modification software, as well as software that examines data within its same cache line, does not cause the split data/code caches to thrash, back and forth, to compete for the same cache line.

In another aspect, it is a feature of the present invention to provide a coherent split data/code on-chip cache, within a microprocessor. The coherent split data/code on-chip cache includes a data cache, a code cache, and cache snoop and state control logic. The data cache stores data that is read from a memory, or is to be stored in the memory. The code cache stores code which is fetched from the memory. The cache snoop and state control logic is coupled between the data cache and the code cache, and allows a cache line to be stored in both the data cache and the code cache, while maintaining coherency between both instances of the cache line.

An advantage of the present invention is that code modification software executes much faster than was heretofore possible.

Another advantage of the present invention is that the MESI coherency protocol is now applied to an internal split cache, as if the split cache were two distinct cache systems.

In another aspect, it is a feature of the present invention to provide a method for sharing a cache line within both a code cache and a data cache, within a microprocessor. The method includes snooping a fetch into a code cache, snooping a read into a data cache, and snooping a write to the data cache. The method further includes comparing the snooped fetch into the code cache with cache lines within the data cache to determine whether the snooped fetch corresponds to data that is also stored within the data cache, and is in either an Exclusive or Shared state. If the snooped fetch corresponds to data within the data cache, and the data is in either an Exclusive or Shared state, the method causes the corresponding data within the data cache to be in the Shared state. The method further includes comparing the snooped read into the data cache with cache lines within the code cache to determine whether the snooped read corresponds to data which is also stored within the code cache, and is in a Shared state. If the snooped read corresponds to data within the code cache, and the data is in a Shared state, the method causes the corresponding data within the code cache to remain in the Shared state.

DESCRIPTION OF THE DRAWINGS

These and other objects, features, and advantages of the present invention will become better understood with regard to the following description, and accompanying drawings where.

DETAILED DESCRIPTION

Figure 4:
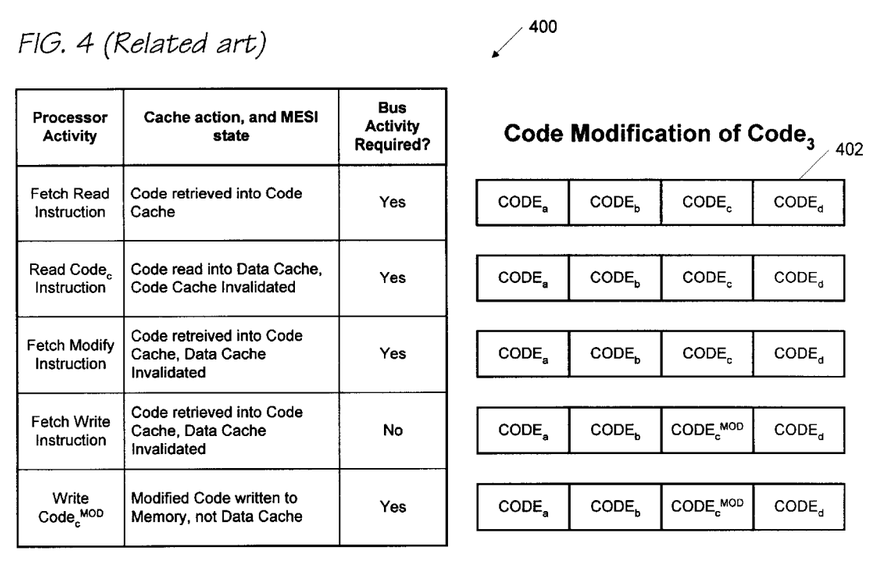
FIG. 4 is a table illustrating bus activity required in a related art split data/code cache system when code modification software is executed.

Referring now to FIG. 4, a table 400 is shown which illustrates system bus activity that is required by a related art processor, similar to that described above in FIG. 3, during execution of code modification software operating on a cache line 402. The cache line 402 is shown to include four pieces of code designated as $CODE_a$, $CODE_b$, $CODE_c$, and $CODE_d$. The code modification software will execute a sequence of processor instructions that will modify the contents of $CODE_c$.

The sequence begins by fetching the first instruction in the sequence (which is located in $CODE_a$). To fetch this instruction, the code cache 305 will retrieve the entire cache line 402 from the memory 306, in four back-to-back transfers, and place the cache line 402 within the code cache 305. The first instruction in the sequence will move the contents of $CODE_c$ into the register file 326 for modification.

As this instruction proceeds from the control unit 322 to the ALU 324, the instruction is executed. Execution of the instruction requires that $CODE_c$ be moved into the register file 326. Thus, the ALU 324 causes the data cache 307 to retrieve the cache line 402 from the memory 306 (or from the level 2 cache 308). The cache line 402 is placed into the data cache 307. In addition, as the cache line 402 is stored into the data cache 307, the cache line 402 within the code cache 305 is made invalid. One skilled in the art will appreciate that the cache line 402 within the code cache 305 is made invalid, because modern processors have not attempted to provide high speed coherency mechanisms between the split data/code caches.

Thus far, two cache line fills have been required, over the system bus 316, during execution of the first instruction. The first line fill was required to fetch the first instruction. The second cache line fill was required during execution of the first instruction.

After retrieving $CODE_c$ and placing it into the data cache 307, the second instruction in the sequence must be fetched. The second instruction in the sequence modifies the contents of $CODE_c$. Since the cache line 402 has been made invalid within the code cache 305, the code cache 305 must perform a cache line fill, and fetch the cache line 402 from the level 2 cache 308. During the cache line fill, the cache line 402 within the data cache 307 is made invalid.

After fetching the second instruction in the sequence, the instruction proceeds from the control unit 322 to the ALU 324. The ALU 324 executes the instruction, which modifies $CODE_c$ within the register file 326. No system bus activity is required during execution of this instruction, since data is neither retrieved nor written to the cache line 402.

Finally, the third instruction (which writes the contents of $CODE_c$ back to memory) is fetched by the code cache 305. Since the contents of the code cache 305 have not been made invalid, the code cache 305 can provide the next instruction in the sequence directly to the control unit 322, without going out on the system bus 316. However, during execution of this write-back instruction, it is determined that the cache line 402 is not in the data cache 307. So, before the instruction can complete, a burst fill of the cache line 402 is required from the level 2 cache 308. In addition, the cache line 402 within the code cache 305 is made invalid. The burst fill is performed, and the modified code is written back into the data cache 307. In the alternative, the instruction may write the modified result straight through to the main memory and invalidate the cache line 402 in the code cache 305.

Thus, from the example in FIG. 4, execution of code modification software within a split/data code on-chip cache has required at least 4 burst transfers on the system bus 316, just to modify one 8-byte section of code. And, a $5^{th}$ burst transfer will ultimately be required to update the memory 306 with the latest contents.

Figure 5:
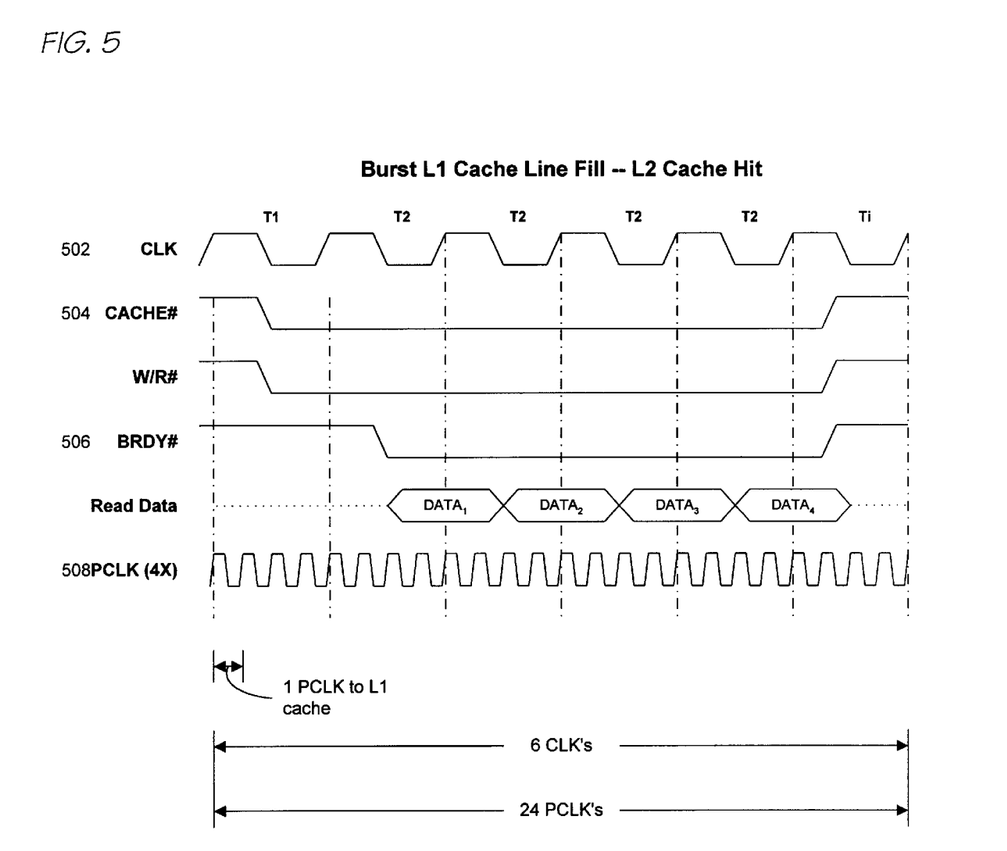
FIG. 5 is a timing diagram illustrating bus cycles required to perform a cache line fill from a level 2 cache in the processor shown in FIG. 3.

To better illustrate the effect a cache line fill has on the performance of an x86 compatible microprocessor, reference is now made to FIG. 5. In FIG. 5, a timing diagram 500 is shown. A CLK signal 502 is provided to indicate clock transitions on the system bus 316. A cache line fill begins by driving a CACHE# signal 504 low. Other signals associated with an x86 burst transfer have been eliminated from the timing diagram 500, for ease of illustration.

During time T1, address signals are driven onto the system bus. During the next four clock times T2, data is transferred, eight bytes at a time, from the L2 cache, to the processor cache. The cache line fill completes when the BRDY# signal 506 is driven back high (indicating that data transfer has completed), and with CACHE# going high. Thus, to fill a cache line within a processor, at least 6 clock cycles are required on the system bus. More cycles may be required if the desired data is not located within the L2 cache, i.e., if the data must be retrieved from the main memory, or even worse, from the hard disk.

Also shown in FIG. 5 is a PCLK signal 508. The PCLK signal 508 shows the internal clock of a microprocessor. It is common to have a microprocessor that operates at a particular multiple of the CLK signal 502. For ease of illustration, a multiple of 4x has been chosen. One skilled in the art appreciates that any multiple may have been used.

Thus, for every 1 CLK cycle, there are 4 PCLK cycles. So, if a 4x microprocessor requires a burst cache line fill into an internal cache, the processor may be required to wait 24 PCLK cycles before it can continue processing. If this were applied to the sequence described above with reference to FIG. 4, approximately 24x4, or 96 PCLK cycles would have been expended, just to perform the cache line fills required by the sequence. If, on the other hand, the processor could have retrieved the required data directly from the appropriate cache, each retrieval would have required only 1 PCLK cycle.

Figure 6:
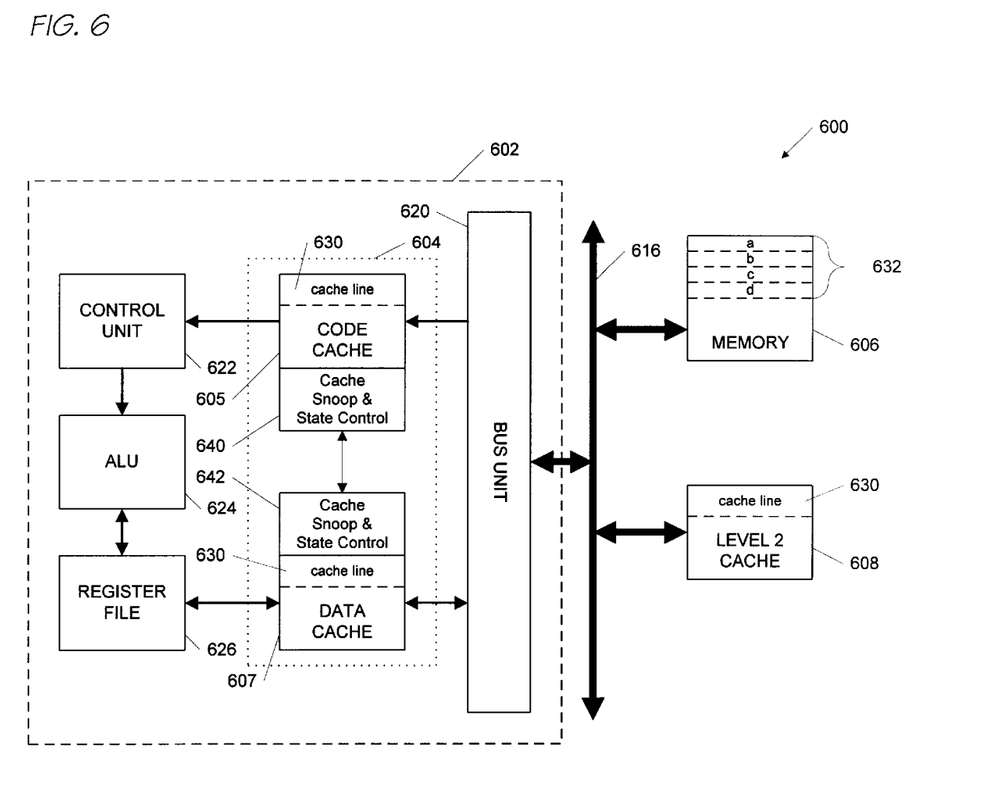
FIG. 6 is a block diagram of a computer system, according to the present invention, particularly illustrating cache snoop and state control for the data/code caches.

Now referring to FIG. 6, a computer system 600 is provided, similar to that described above with reference to FIG. 3. Like elements are indicated with like numbers, the hundreds digit replaced with a 6. However, the microprocessor 602 also includes cache snoop and state control 640, 642, coupled to the code cache 605, and the data cache 607. The cache snoop and state control 640, 642 maintains the state of cache line 630 within both the code cache 605, and the data cache 607, according to the state diagrams shown in FIGS. 7 and 8, discussed further below. In addition, the cache snoop and state control 640, 642 allows the code cache 605 to snoop reads and writes to the data cache 607, and allows the data cache 607 to snoop fetches to the code cache 605, so that the state of the cache line 630 within each of the caches 605, 607 is maintained. More specifically, the cache snoop and state control 640, 642 implements a MESI coherency protocol within an on-chip split data/code level 1 cache. Before discussing the specific state transitions implemented by the cache snoop and state control 640, 642, a brief background of MESI is considered appropriate.

Within a computer system, a cache consistency protocol is a set of rules by which states are assigned to cache lines. The rules apply for memory read/write cycles only. Every line in the processor's data cache is assigned a state dependent on both processor generated activities, and activities generated by other bus masters (e.g., snooping) One cache protocol within x86 compatible processors consists of 4 states that define whether a cache line is valid, if it is available in other caches, and if it has been MODIFIED. The four states are M (Modified), E (Exclusive), S (Shared) and I (Invalid), and the protocol is referred to as the MESI protocol.

An M-state cache line is available in only one cache and it is also Modified (different from main memory). An M-state line can be accessed (read/written to) without sending a cycle out on the bus.

An E-state cache line is also available in only one cache in the system, but the line is not Modified (i.e., it is the same as main memory). An E-state line can be accessed (read/written to) without generating a bus cycle. A write to an E-state line will cause the line to become Modified.

An S-state cache line indicates that it is potentially shared with other caches (i.e., the same line may exist in more than one cache). A read to an S-state line will not generate bus activity, but a write to a Shared line will generate a write-through cycle on the bus. The write-through may invalidate this line in other caches. A write to an S-state line will update the cache.

An I-state line indicates that the line is not available in the cache. A read to this line will be a miss and will cause the processor to execute a line fill (fetch the whole line into the cache from main memory). A write to an I-state line will cause the processor to execute a write-through cycle on the bus.

For a more complete explanation of the MESI protocol, reference is made to § 3.7.7, Volume 1, *Pentium Processor Family Developer's Manual*, and Chapter 4, *Pentium Processor System Architecture*, $2^{nd}$ ed., by Anderson/Shanley.

While related art microprocessors have implemented MESI within an on-chip cache, the on-chip cache has been viewed as a single cache, rather than a split cache. This has resulted in the problems discussed above with reference to FIGS. 3 & 4.

Figure 7:
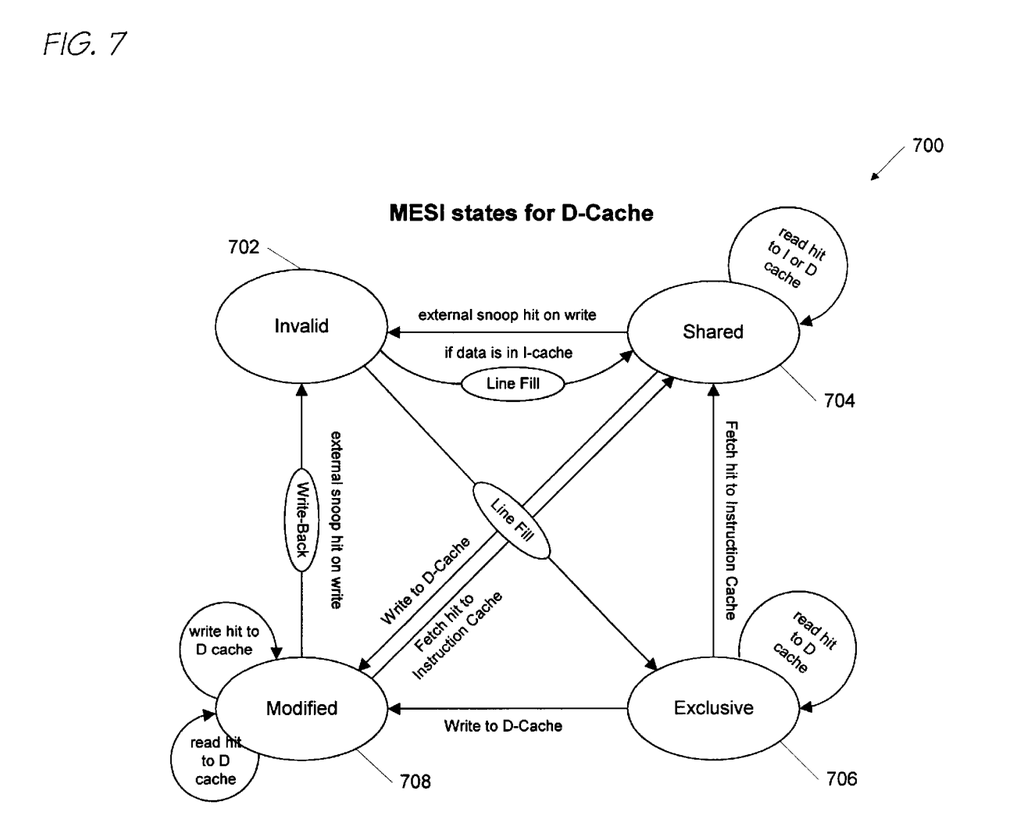
FIG. 7 is a state diagram of a MESI state machine for the data cache of FIG. 6.

Now referring to FIG. 7, a state diagram 700 illustrates an implementation of the MESI protocol, by the cache snoop and state control 640, 642, as applied to the data cache 607. A cache line 630 within the data cache 607 begins in an Invalid state 702, indicating that the cache line is not available in the data cache 607.

When a read request is made to the cache line 630, a burst line fill is performed. If the requested data is in the code cache 605, the cache line 630 within the data cache 607 is changed to the Shared state 704. In one embodiment, the data in the cache line 630 may be snarfed from the code cache 605. If the cache line is not in the code cache 605, data is brought into the data cache 607, from either the memory 606, or the level 2 cache 608. When the cache line 630 within the data cache 607 has been filled, the state of the cache line 630 is changed to Exclusive 706.

The state of the cache line 630 within the data cache 607 remains in the Exclusive state as long as future read requests are made to the data cache 607. If the cache snoop and state control 640, 642 detects a fetch by the control unit 622 to the cache line 630 in the code cache 605, rather than invalidating the cache line 630 within the data cache 607, the state of the cache line 630 in the data cache 607 is changed to the Shared state 704. The cache line 630 within the code cache 605 is either filled by performing a burst fill from the main memory 606, from the level 2 cache 608, or in one embodiment, is snarfed directly from the data cache 607. If a write to cache line 630 within the data cache 607 occurs while it is in the Exclusive state, the cache line is changed to the Modified state 708.

If the cache line 630 within the data cache 607 is in the modified state 708, both reads and writes to the cache line 630 cause the state of the cache line 630 to remain in the Modified state 708. If a fetch to the cache line 630 within the code cache 605 is made, the state of the cache line 630 within the data cache 607 is changed to the Shared state 704. In addition, the modified cache line 630 in the data cache is written out to the main memory 606 (or to the level 2 cache 608), and then a burst fill is performed by the code cache 605. If an external snoop hit is made to the modified cache line 630 in the data cache 607, the state of the cache line 630 is changed to the Invalid state 702, and the line is written back to memory.

If the cache line 630 within the data cache 607 is in the Shared state 704 (indicating that the cache line 630 is within both the code cache 605 and data cache 607), reads to either the code cache 605, or the data cache 607, cause the state of the cache line 630 within the data cache 607 to remain in the Shared state 704. This allows the cache line 630 to be used by both the control unit 622 for code fetches, and by the ALU 624, for data reads, as long as possible, without causing the split caches to thrash back and forth, competing over the same cache line. As will be seen in the discussion related to FIGS. 9–11 below, allowing the cache line 630 to be Shared between the code cache 605 and the data cache 607 provides a significant performance advantage.

If while in the Shared state 704, a write occurs to the cache line 630 within the data cache 607, the state of the cache line 630 is changed to the Modified state 708. Or, if an external snoop hit on write occurs to the cache line 630 within the data cache 607, the state of the cache line 630 is changed to the Invalid state 702.

Figure 8:
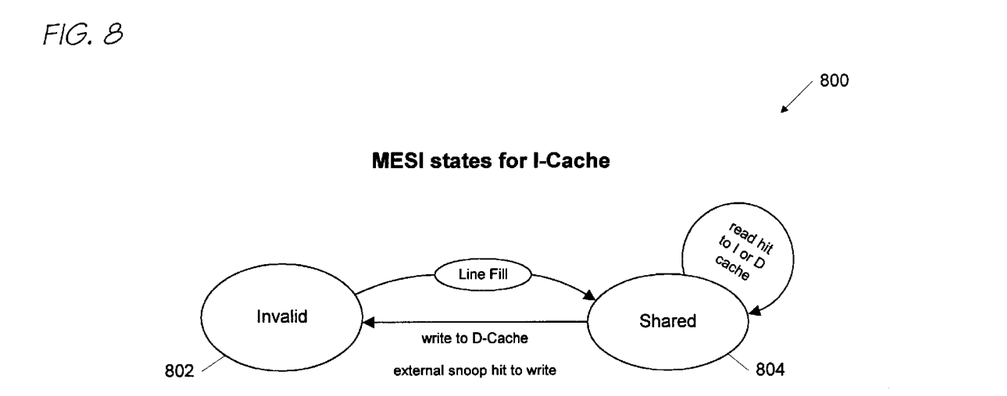
FIG. 8 is a state diagram of a MESI state machine for the code cache of FIG. 6.

Now referring to FIG. 8, a state diagram 800 is provided which illustrates how the cache snoop and state control 640, 642 operates with the code cache 605. Since writes to the code cache 605 are not allowed, the only two states applicable to the code cache 605 are the Invalid state 802, and the Shared state 804. The cache line 630 within the code cache 605 begins in the Invalid state 802. The line remains in the Invalid state 802 until a fetch request for the cache line 630 is made by the control unit 622. When a fetch request is made, the cache line 630 within the code cache 605 is filled, either from the memory 606, the level 2 cache 608, or in one embodiment, it may be snarfed from the data cache 607.

When the cache line 630 within the code cache 605 is filled, the state of the cache line 630 is changed to the Shared state 804.

The cache line 630 within the code cache 605 remains in the Shared state 804 during future fetch requests by the control unit 622, and during future read requests by the ALU 624 to the cache line 630 within the data cache 607. As mentioned above, by allowing the cache line 630 to remain in the Shared state 804 in the code cache 605, and in the Shared state 704 in the data cache 607, the split caches do not compete for the same cache line, and external bus activity has been eliminated for future fetches and reads.

If the cache snoop and state control 640, 642 detects a write to the cache line 630 in the data cache 607, the state of the cache line 630 within the code cache 605 is changed to the Invalid state 802. In addition, external snoop hits resulting from writes also cause the cache line 630 within the code cache 605 to transition to the Invalid state 802.

Figure 9:
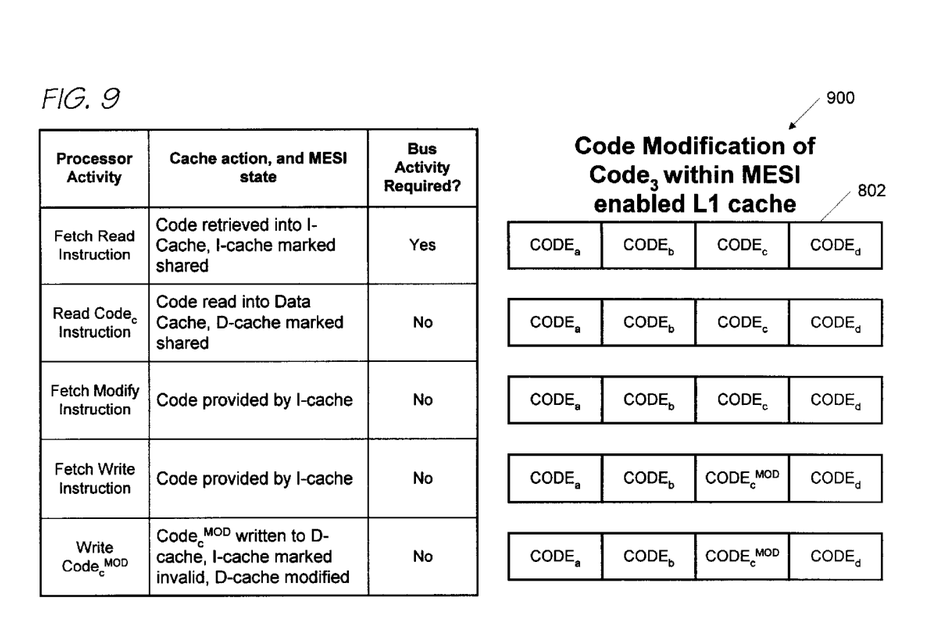
FIG. 9 is a table illustrating bus activity required in a processor according to the present invention when code modification software is executed.

To further illustrate the advantages of the present invention, attention is now directed to the table 900 in FIG. 9. Table 900 illustrates system bus activity that is required by the microprocessor 600, according to the present invention, during execution of the code modification software discussed above with reference to FIG. 4. A cache line 802 is shown to include four pieces of code designated as $CODE_a$, $CODE_b$, $CODE_c$, and $CODE_d$. The code modification software will execute a sequence of processor instructions that will modify the contents of $CODE_c$.

During a first processor cycle, the control unit 622 fetches the first instruction of the sequence (which reads the cache line 902), and places it into the code cache 605, as Shared. During execution of this instruction, the cache line 902 is snarfed from the code cache 605 into the data cache 607, and is marked Shared in the data cache 607. In an alternative embodiment, the data cache 307 retrieves the cache line 902 from the main memory, and marks it as Shared. In either situation, the cache line 902 resides in both the code cache 605 and the data cache 607, and is marked Shared in both caches. Thus, until a write occurs to the cache line 902 within the data cache 607, the cache line 902 can be fetched by the control unit 622 from the code cache 605, and read by the ALU 624 from the data cache 607, without requiring the microprocessor 602 to go on the system bus 616 to retrieve the cache line.

So, when the second instruction in the sequence (the modify instruction) is fetched by the control unit 622, it is provided directly by the code cache 605. When the modify instruction proceeds to execution, if it requires access to the cache line 902, it can be provided directly by the data cache 607.

When the third instruction in the sequence (the write instruction) is fetched by the control unit 622, it is provided directly by the code cache 605. When this instruction proceeds to execution, it writes the modified data into the cache line 902 within the data cache 607. At this point, the cache line 902 within the data cache 607 is changed to the Modified state, and the cache line 902 within the code cache 605 is changed to the Invalid state. The data cache 607 will write-back the modified cache line 907 upon an external snoop to write.

So, by snooping fetches to the code cache 605, and reads and writes to the data cache 607, and by modifying the states of cache lines within the split data/code caches to allow cache lines to be shared between the data and code caches, a sequence of instructions that performs code modification of a cache line 902 can execute by performing a single cache line fill, and then complete execution without having to access the system bus 616. What had previously required 4×24 (96) PCLK's to complete, is now performed in less than 30.

Figure 10:
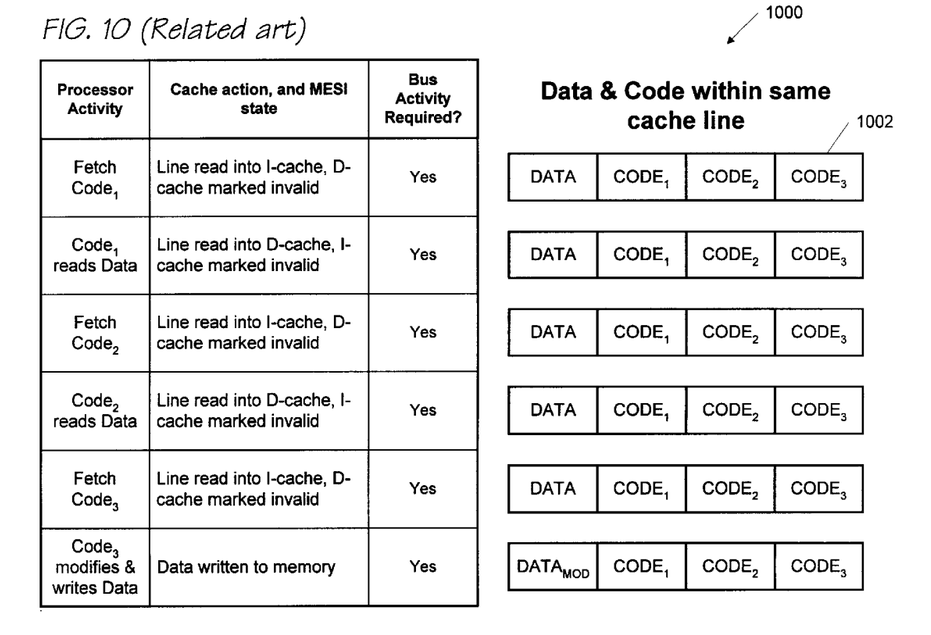
FIG. 10 is a table illustrating bus activity required in a related art split data/code cache when data and code are in the same cache line.

To further illustrate the advantages of the present invention, attention is now directed to FIG. 10. In FIG. 10, a table 1000 is provided that illustrates bus activity required by a related art processor, similar to that shown in FIG. 3, when an instruction sequence within a cache line 1002 repetitively analyzes and modifies data within the cache line 1002.

During a first instruction cycle, $CODE_1$ is fetched by the control unit 322, causing the code cache 305 to perform a cache line fill from the memory 306. The instructions within $CODE_1$ read the DATA within the cache line 1002. As the instructions proceed to execution, the instructions require the DATA to be read into the data cache 307. The data cache 307 performs a burst line fill to get the cache line 1002, and invalidates the cache line 1002 within the code cache 305.

During a subsequent instruction cycle, $CODE_2$ is fetched by the control unit 322, causing the code cache 305 to perform a cache line fill from the memory 306 (since the previously fetched cache line 1002 has been invalidated). The cache line 1002 is stored into the code cache 305, and the cache line 1002 within the data cache 307 is invalidated.

During execution of $CODE_2$, the DATA within the cache line 1002 must be read, which requires the data cache 307 to perform a cache line fill from the memory 306. In addition, the cache line 1002 within the code cache is invalidated.

During a subsequent instruction cycle, $CODE_3$ is fetched by the control unit 322, causing the code cache 305 to perform a cache line fill from the memory 306. The cache line 1002 is stored into the code cache 305, and the cache line 1002 within the data cache 307 is invalidated. This code modifies a portion of the DATA that is in the register file 326, and attempts to store the modified DATA into the data cache 307. However, since the cache line 1002 does not reside in the data cache 307, the $DATA_{MOD}$ is written directly to the memory 306.

The code sequence illustrated with respect to FIG. 10 only shows part of the problem. If the code sequence within the cache line 1002 was part of a program loop which examined the DATA within the cache line 1002, every cycle through the loop would require a burst fill into both the code cache 305, and data cache 307.

Figure 11:
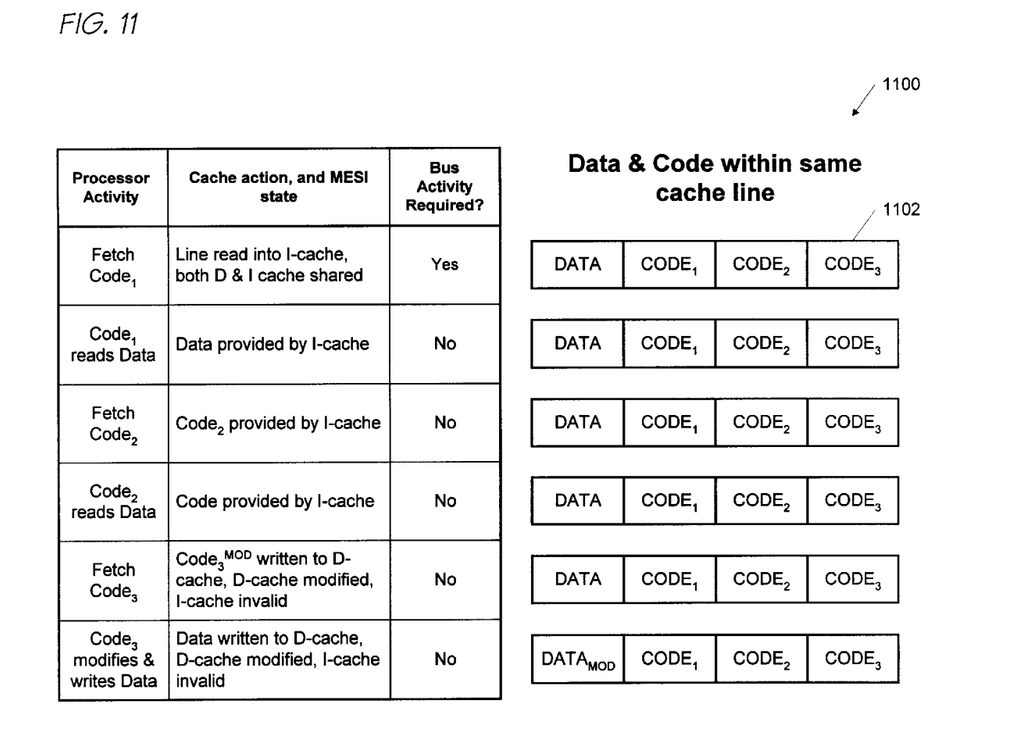
FIG. 11 is a table illustrating bus activity required in a processor according to the present invention when data and code are in the same cache line.

Now referring to FIG. 11, a table 1100 is shown which illustrates bus activity required by the microprocessor 602 described above with reference to FIG. 6, when an instruction sequence within a cache line 1102 repetitively analyzes and modifies data within the cache line 1102.

During a first instruction cycle, $CODE_1$ is fetched by the control unit 622, causing the code cache 605 to perform a cache line fill from the memory 606. The instructions within $CODE_1$ read the DATA within the cache line 1102. As the instructions proceed to execution, the instructions require the DATA to be read into the data cache 307. The cache snoop and state control 640, 642 detects that the cache line 1102 is available in the code cache 605, and is in the Shared state. The data cache 607 snarfs the cache line 1102 from the code cache 605, and marks it Shared in the data cache 607. In the alternative, the data cache 607 performs a burst line fill from the memory 606, but places the cache line 1102 in the Shared state.

During a subsequent instruction cycle, $CODE_2$ is fetched by the control unit 622, directly from the code cache 605.

During execution of CODE$_2$, the DATA within the cache line 1102 is read directly from the data cache 607. Thus, for both the code fetch, and the data read, the cache line 1102 existed in the Shared state in the appropriate cache.

During a subsequent instruction cycle, CODE$_3$ is fetched by the control unit 622, directly from the code cache 605. This code modifies a portion of the DATA that is in the register file 626, and stores the modified DATA into the data cache 607. Since the cache line 1102 resides in the data cache 607, the DATA$_{MOD}$ is written to the data cache 607, without requiring the processor 602 to write-through to the memory 606. When the DATA$_{MOD}$ is written to the data cache 607, the cache line 1102 is marked as Modified, and the cache line 1102 within the code cache 605 is invalidated.

So, by utilizing the method and apparatus of the present invention, the instruction sequence within the cache line 1102 can continuously loop, analyzing the data within the cache line 1102, without performing subsequent cache line fills on the system bus 616.

Although the present invention has been described in considerable detail with reference to certain preferred versions thereof, other versions are possible. For example, the mechanism that has been shown to implement the MESI coherency protocol was the cache snoop and state control, shown coupled to both the code cache and the data cache. One skilled in the art should appreciate that this logic could be implemented using a state machine, or a state machine combined with dedicated snoop logic associated with each of the two caches. Moreover, the present invention could be pushed out of the microprocessor, should off-chip caches be split between data and code. Furthermore, other cache architectures may divide a single cache into a plurality of caches that simultaneously share a common cache line. The method and apparatus of the present invention could be used to maintain cache coherency between those split caches. Finally, the states that are tracked within the code cache are Shared and Invalid, only because Modified and Exclusive typically relate to caches which may be written to. If other states are created for the code cache, or for the data cache for that matter, the idea of the present invention would still allow a divided cache to share a cache line.

Although the present invention and its advantages have been described in detail, those skilled in the art should appreciate that they can readily use the disclosed conception and specific embodiments as a basis for designing or modifying other structures for carrying out the same purposes of the present invention. In addition, it should be understood that various changes, substitutions and alterations can be made herein without departing from the spirit and scope of the invention as defined by the appended claims.

We claim:

1. A microprocessor, for implementing MESI within a split L1 cache, the microprocessor comprising:

a bus unit, for coupling the microprocessor to an external system bus;

a data cache, coupled to said bus unit, for temporarily storing data which is read from a memory on the system bus, or to be stored in the memory, said data cache comprising a first plurality of cache lines;

a code cache, coupled to said bus unit, for temporarily storing code which is fetched from the memory, said code cache comprising a second plurality of cache lines; and cache snoop and state control logic, coupled to said data cache and to said code cache, said cache snoop and state control logic allowing a cache line to be stored in both of said data cache and said code cache, while maintaining coherency between both instances of said cache line.

2. The microprocessor, as recited in claim 1, wherein MESI is a cache consistency protocol which establishes a set of rules by which states are assigned to each of said first and second plurality of cache lines.

3. The microprocessor, as recited in claim 2, wherein the states assignable to said first plurality of cache lines comprise:

M—Modified;
    E—Exclusive;
    S—Shared; and
    I—Invalid.

4. The microprocessor, as recited in claim 2, wherein the states assignable to said second plurality of cache lines comprise:

S—Shared; and
    I—Invalid.

5. The microprocessor, as recited in claim 1, wherein the microprocessor is an x86 compatible microprocessor.

6. The microprocessor, as recited in claim 1, wherein the external system bus connects the microprocessor to the memory.

7. The microprocessor, as recited in claim 1, wherein the microprocessor further comprises a register file, coupled to said data cache, for reading data from and storing data to said data cache.

8. The microprocessor, as recited in claim 1, wherein each of said first plurality of cache lines stores 32 bytes of data.

9. The microprocessor, as recited in claim 8, wherein said 32 bytes of data are addressable 8 bytes at a time.

10. The microprocessor, as recited in claim 1, wherein each of said first plurality of cache lines may be filled from the memory using a burst fill operation.

11. The microprocessor, as recited in claim 10, wherein said burst fill operation comprises four back to back 8-byte transfers from the memory to said data cache.

12. The microprocessor, as recited in claim 10, wherein cache lines that are filled from the memory are first marked with an Exclusive state.

13. The microprocessor, as recited in claim 1, wherein the memory is a level 2 cache.

14. The microprocessor, as recited in claim 1, wherein the microprocessor further comprises a control unit, coupled to said code cache, for fetching instructions from said code cache for execution by the microprocessor.

15. The microprocessor, as recited in claim 1, wherein each of said second plurality of cache lines comprises 32-bytes of data.

16. The microprocessor, as recited in claim 1, wherein code which is fetched into said code cache is first marked with a Shared state.

17. The microprocessor, as recited in claim 1, wherein said cache snoop and state control logic snoops code fetches made by the microprocessor into said code cache to determine whether the code which is being fetched is also stored within one of said first plurality of cache lines within said data cache.

18. The microprocessor, as recited in claim 17, wherein if the code which is being fetched is stored within said one of said first plurality of cache lines within said data cache, and said one of said first plurality of cache lines is marked as Exclusive, said cache snoop and state control logic marks said one of said first plurality of cache lines as Shared.

19. The microprocessor, as recited in claim 17, wherein if the code which is being fetched is stored within said one of said first plurality of cache lines within said data cache, and said one of said first plurality of cache lines is marked as Shared, said cache snoop and state control logic maintains said one of said first plurality of cache lines as Shared.

20. The microprocessor, as recited in claim 17, wherein if the code which is being fetched is stored within said one of said first plurality of cache lines within said data cache, and said one of said first plurality of cache lines is marked as Modified, said cache snoop and state control logic causes said one of said first plurality of cache lines to be written back to the memory, and marks said one of said first plurality of cache lines as Shared.

21. The microprocessor, as recited in claim 17, wherein if the code which is being fetched is stored within said one of said first plurality of cache lines within said data cache, and said one of said first plurality of cache lines is marked as Modified, said cache snoop and state control logic causes said one of said first plurality of cache lines to be written back to the memory, and marks said one of said first plurality of cache lines as Invalid.

22. The microprocessor, as recited in claim 1, wherein said cache snoop and state control logic snoops data reads made by the microprocessor into said data cache to determine whether the data which is being read is also stored within one of said second plurality of cache lines within said code cache.

23. The microprocessor, as recited in claim 22, wherein if the data which is being read is stored within said one of said second plurality of cache lines within said code cache, and said one of said cache lines is marked as Shared, said cache snoop and state control logic marks the data which is being read as Shared.

24. The microprocessor, as recited in claim 1, wherein said cache snoop and state control logic snoops data writes made by the microprocessor into said data cache to determine whether the data which is being written is also stored within one of said second plurality of cache lines within said code cache.

25. The microprocessor, as recited in claim 1, wherein if the data which is being written is also stored within said one of said second plurality of cache lines within said code cache, said cache snoop and state control logic marks said one of said second plurality of cache lines as Invalid.

26. The microprocessor, as recited in claim 1, wherein when said cache line is stored in both of said data cache and said code cache, said both instances of said cache line are marked as Shared.

27. A coherent split data/code on-chip cache, within a microprocessor, the coherent split data/code on-chip cache comprising:
   a data cache, for storing data which is read from a memory, or is to be stored in the memory;
   a code cache, for storing code which is fetched from the memory; and
   cache snoop and state control logic, coupled between said data cache and said code cache, for allowing a cache line to be stored in both of said data cache and said code cache, while maintaining coherency between both instances of said cache line.

28. The coherent split data/code on chip cache, as recited in claim 27, wherein said data cache comprises a first plurality of cache lines.

29. The coherent split data/code on chip cache, as recited in claim 28, wherein said code cache comprises a second plurality of cache lines.

30. The coherent split data/code on chip cache, as recited in claim 29, wherein the data size of each of said first plurality of cache lines is the same as that of each of said second plurality of cache lines.

31. The coherent split data/code on chip cache, as recited in claim 27, wherein said data cache and said code cache can each store a cache line which contains both data and code.

32. The coherent split data/code on chip cache, as recited in claim 27, wherein said cache snoop and state control logic implements a MESI protocol between said data cache and said code cache, to allow a cache line to remain in both of said caches, until said cache line is modified, or made invalid, in said data cache.

33. The coherent split data/code on chip cache, as recited in claim 27, wherein said cache snoop and state control logic snoops code fetches made by the microprocessor into said code cache to determine whether the code which is being fetched is also stored within said data cache.

34. The coherent split data/code on chip cache, as recited in claim 33, wherein if the code which is being fetched is stored within said data cache, and its state within said data cache is Exclusive, said cache snoop and state control logic changes its state to Shared.

35. The coherent split data/code on chip cache, as recited in claim 33, wherein if the code which is being fetched is stored within said data cache, and its state within said data cache is Shared, said cache snoop and state control logic maintains its state as Shared.

36. The coherent split data/code on chip cache, as recited in claim 33, wherein if the code which is being fetched is stored within said data cache, and its state within said data cache is Modified, said cache snoop and state control logic causes it to be written back to the memory, and changes the state of the code within said data cache to Shared.

37. The coherent split data/code on chip cache, as recited in claim 27, wherein said cache snoop and state control logic snoops data reads made by the microprocessor into said data cache to determine whether the data which is being read is also stored within said code cache.

38. The coherent split data/code on chip cache, as recited in claim 37, wherein if the data which is being read is stored within said code cache, and its state within said code cache is Shared, said cache snoop and state control logic keeps its state as Shared.

39. The coherent split data/code on chip cache, as recited in claim 27, wherein said cache snoop and state control logic snoops data writes made by the microprocessor into said data cache to determine whether the data which is being written is also stored within said code cache.

40. The coherent split data/code on chip cache, as recited in claim 39, wherein if the data which is being written is also stored within said code cache, said cache snoop and state control logic changes the state of the data within said code cache to Invalid.

41. A method for sharing a cache line within both a code cache and a data cache, within a microprocessor, the method comprising the steps of:
   snooping a fetch into a code cache;
   snooping a read into a data cache;
   snooping a write to the data cache;
   comparing the snooped fetch into the code cache with cache lines within the data cache to determine whether the snooped fetch corresponds to data which is also stored within the data cache, and is in either an Exclusive or Shared state; and
      if the snooped fetch corresponds to data within the data cache, and the data is in either an Exclusive or Shared state, causing the corresponding data within the data cache to be in the Shared state;

comparing the snooped read into the data cache with cache lines within the code cache to determine whether the snooped read corresponds to data which is also stored within the code cache, and is in a Shared state; and if the snooped read corresponds to data within the code cache, and the data is in a Shared state, causing the corresponding data within the code cache to remain in the Shared state.

42. The method for sharing a cache line within both a code cache and a data cache, as recited in claim 41, the method further comprising the step of:

comparing the snooped write to the data cache with cache lines within the code cache to determine whether the snooped write corresponds to data which is also stored within the code cache; and if the snooped write corresponds to data within the code cache, causing the corresponding data within the code cache to have an Invalid state.

43. The method for sharing a cache line within both a code cache and a data cache, as recited in claim 41, wherein the data within either the code or data cache lines can contain code, data, or a combination of both.

44. The method for sharing a cache line within both a code cache and a data cache, as recited in claim 41, wherein said step of causing data within the data cache to be in the Shared state means that a previous Shared state indicator is not overwritten.

45. The method for sharing a cache line within both a code cache and a data cache, as recited in claim 41, wherein said step of causing data within the code cache to be in the Shared state means that a previous Shared state indicator is not overwritten.

* * * * *